United States Patent [19]
Fahl et al.

[11] Patent Number: 5,791,694
[45] Date of Patent: Aug. 11, 1998

[54] LOCK FOR COUPLING CAM ARMS

[75] Inventors: Richard L. Fahl, Fairfield; Todd William Anderson; Christopher Robert Moses, both of Cincinnati; Daniel Mason Allen, Middletown, all of Ohio

[73] Assignee: Dover Corporation, New York, N.Y.

[21] Appl. No.: 803,351

[22] Filed: Feb. 20, 1997

[51] Int. Cl.⁶ .................................................. F16L 35/00
[52] U.S. Cl. .............................. 285/38; 285/88; 285/312; 285/330
[58] Field of Search ........................ 285/82, 87, 88, 285/312, 38, 330

[56] References Cited

U.S. PATENT DOCUMENTS

| | | | |
|---|---|---|---|
| 3,124,374 | 3/1964 | Krapp | 285/312 X |
| 3,314,698 | 4/1967 | Owens | 285/312 |
| 3,439,942 | 4/1969 | Moore et al. | |
| 3,632,142 | 1/1972 | Ichihara | 285/88 |
| 4,647,075 | 3/1987 | Vargo | 285/82 |
| 4,802,694 | 2/1989 | Vargo | 285/87 |
| 5,295,717 | 3/1994 | Chen | |
| 5,435,604 | 7/1995 | Chen | |

*Primary Examiner*—Dave W. Arola
*Attorney, Agent, or Firm*—Dinsmore & Shohl LLP

[57] ABSTRACT

A low profile locking mechanism for securing a lever arm of a coupler in a locked position interlocks with the side surface of the lever arm. The locking mechanism is formed from low cost resiliently deformable material that is protected against impact by the lever arm.

24 Claims, 3 Drawing Sheets

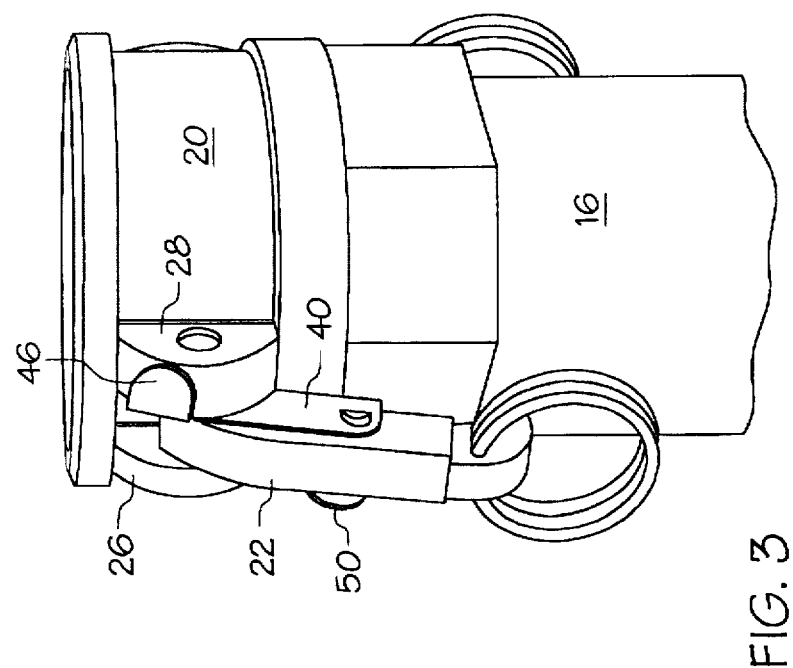
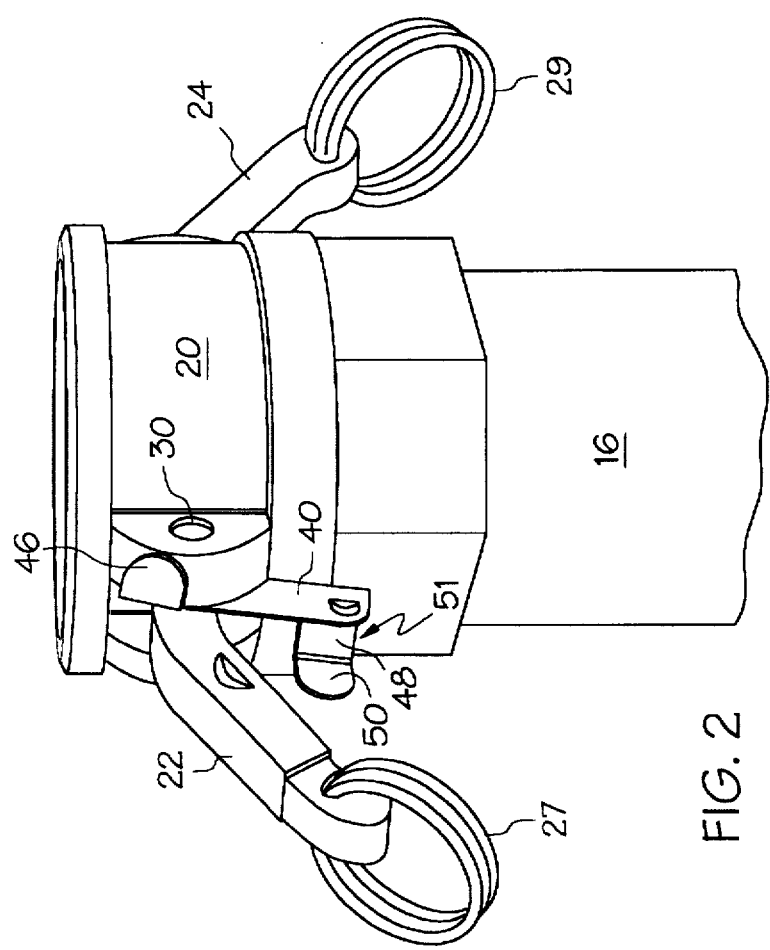

| # LOCK FOR COUPLING CAM ARMS

TECHNICAL FIELD

The present invention relates generally to quick disconnect couplings of the type that include pivotally mounted lever arms for quickly attaching or disattaching a male coupling member to a female coupling member, and more particularly to devices for selectively securing such lever arms in a locked position. The invention will be specifically disclosed in connection with an inexpensive, manually releasable locking device for limiting rotation of a pivotally mounted lever arm on a coupling.

BACKGROUND OF THE INVENTION

It has become common commercial practice to use quick disconnect couplings to connect and disconnect hoses and other types of fluid conduits. One particularly advantageous type of coupling uses a male coupling member having an annular groove adjacent its connecting terminus. The male connecting member is received by and selectively coupled to a female connecting member that includes a pair of oppositely disposed pivotally mounted cam members. These cam members are connected (usually integrally) to cam arms that extend outside of the female member received by the annular groove of the male member. The cam arms are manually movable between an unlocked position, in which the arms extend radially outwardly from the female coupling member, to a locked position, in which the cam arms are positioned along side of the female coupling member. The cam surfaces are configured such that the radial extension of the cam surfaces vary in accordance with the position of the cam arms. In the unlocked position of the cam arms, the cam surfaces do not extend fully into the groove of the male coupling member, and the male coupling member is axially movable out of the female coupling member. In the locked position of the cam arms, the surfaces of the cam members extend fully into and are pressed against the annular groove of the male coupling, thereby securing the male and female coupling members in interlocking relationship.

Since cam arms of this type occasionally are rotated inadvertently, and since inadvertent rotation of the cam arms uncouples the male and female coupling members, it also has been found desirable to provide mechanisms for preventing such inadvertent rotation. In one type of widely used mechanism, as exemplified in U.S. Pat. Nos. 5,295,717 and 5,435,604, a reciprocally movable plunger is disposed in each of the cam arms. The plunger is spring biased to an extended position. When so extended, an inboard end of the plunger passes through a complementary shaped hole in the female housing to prevent relative rotation between the cam arm and the female housing. The outboard end of the plunger is attached to a ring, and pulling of the ring overcomes the bias of the plunger spring to retract the plunger into the cam arm. When the plunger is retracted, rotational movement of the cam arm is permitted.

While plunger type locking mechanisms, such as described above, have met considerable success, they have several shortcomings. One significant shortcoming is cost. One type of lower cost mechanism for securing cam arms in their locked position is disclosed in U.S. Pat. No. 3,439,942. In that mechanism, a retaining member is secured to the pivot pin for each of the cam arms. An abutment surface on the retaining member prevents relative rotation between the retaining member and the female coupling member. The retaining member has two distinct portions. The first portion is planar and contacts the side of the cam arm. The retaining member's second portion sets upon the first portion and is angled relative thereto so as to extend over outside surface of the cam arm to prevent rotation of the cam arm. The second portion of the retaining member has sufficient resiliency to permit movement with respect to the first portion. When it is desired to rotate the cam arms, pressure is applied to the second portion, usually by the thumb of an operator, and that second portion is flexed so as to remove the second portion from the rotational path of the cam arm.

These second type of retaining members, described above, also have been successful in the marketplace. However, in applications where the couplings are subjected to abuse, such as frequently occurs when hoses are dropped off of trucks, or dragged across the ground, these later type retainers are subject to damage. More particularly, these retainer members inherently extend outwardly beyond the cam arms. Moreover, these retainer members typically are made of lightweight materials so as to allow deflecting movement of the second portions, described above, in response to only thumb pressure of a user. Due to these inherent design characteristics, such low cost retainer members typically are bent when the couplings are subject to considerable impact.

SUMMARY OF THE INVENTION

Accordingly, it is a primary object of the invention to provide a low cost retaining mechanism for securing a cam arm of a coupling member against unintended rotation while permitting quick, easy release of the cam arm to allow rotation.

It is another object of the invention to provide a low profile thumb releasable retainer member for securing a coupling cam arm in a locked position.

It is yet another object of the invention to provide a cam actuated coupling system having a retainer member that is protected against impact by lever arms for the cam members.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, a device is provided for selectively limiting rotation of a lever arm on a coupling member and securing the lever arm in a locked position. The device includes a base portion that is adapted for attachment to a coupling member. The base portion has an interlocking interface on its side. The interlocking interface is adapted to selectively interlock with the lever arm for coupling the base portion to a lever arm to limit rotation of the lever arm. The device further includes a stop surface attached to the base portion. The stop surface is adapted to engage a portion of the coupling member so as to limit relative rotation of the base portion with respect to a coupling member. A manually actuated pressure surface is attached to the base portion. This pressure surface is operative, upon the application of pressure thereto, to deflect the base portion when the base portion is secured to a coupling member. The application of pressure to the pressure surface is thus operative to uncouple the base portion from a lever arm and to permit rotation of the lever.

According to another aspect of the invention, the interlocking interface of the device includes a protrusion that extends outwardly from the base portion.

3

In yet another aspect of the invention, the pressure surface is positioned in spaced relationship to the base portion so as to accommodate placement of a lever arm in the space between the pressure surface and the base portion and to position the base portion and the pressure surface adjacent opposite sides of a lever arm so placed.

In another aspect of the invention, the pressure surface is orientated in generally parallel relationship to the base portion.

In another aspect of the invention, the pressure surface is interconnected to the base portion by a connecting portion that extends outwardly from the base portion. The connecting portion preferably extends outwardly from a bottom portion of the base portion and is generally perpendicular relationship to the base portion and the pressure surface.

According to still another aspect of the invention, the connecting portion cooperates with the base portion and pressure surface to define an open-sided receiving channel.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawing and description will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention. In the drawings:

FIG. 2 is a perspective view of a female coupling member with pivotally mounted cam arms that are positioned in an unlocked position and a retainer constructed in accordance with the principles of the present invention;

FIG. 3 a perspective view similar to FIG. 2, but showing the cam arms secured by the retainer a locked position.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT OF THE INVENTION

Figure 1:
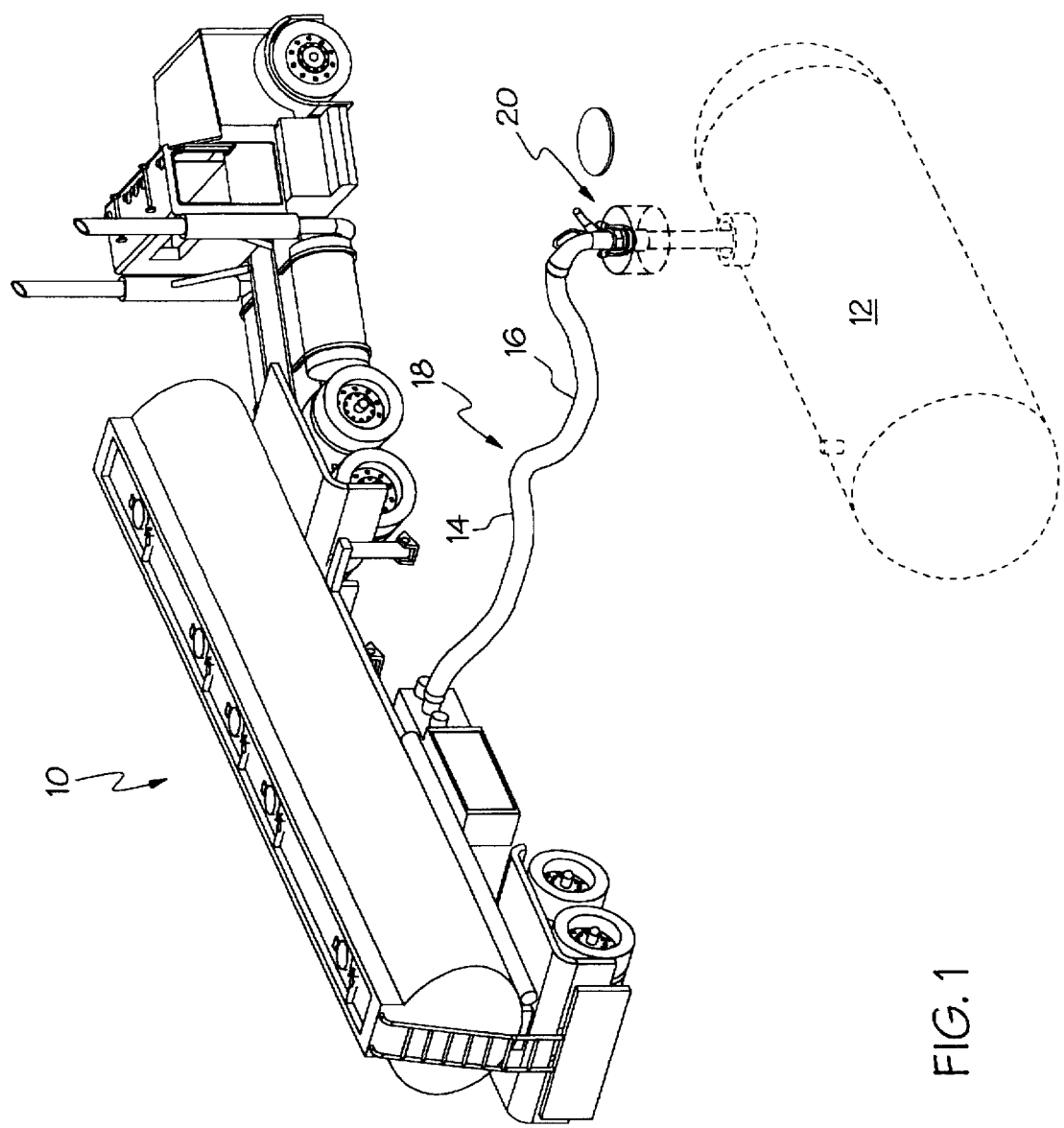
FIG. 1 is a schematic illustration showing one application for couplings of the type to which the present invention is directed.

Turning now to the drawings, FIG. 1 depicts a gasoline storage truck, generally designated by the numeral 10, as it is being used to dispense gasoline into an underground storage tank 12 through a plurality of interconnected hoses 14 and 16. The hoses 14 and 16 are coupled by male coupling member 18 and female coupling member 20 respectively connected to adjoining ends of the hoses 14 and 16.

Figure 4:
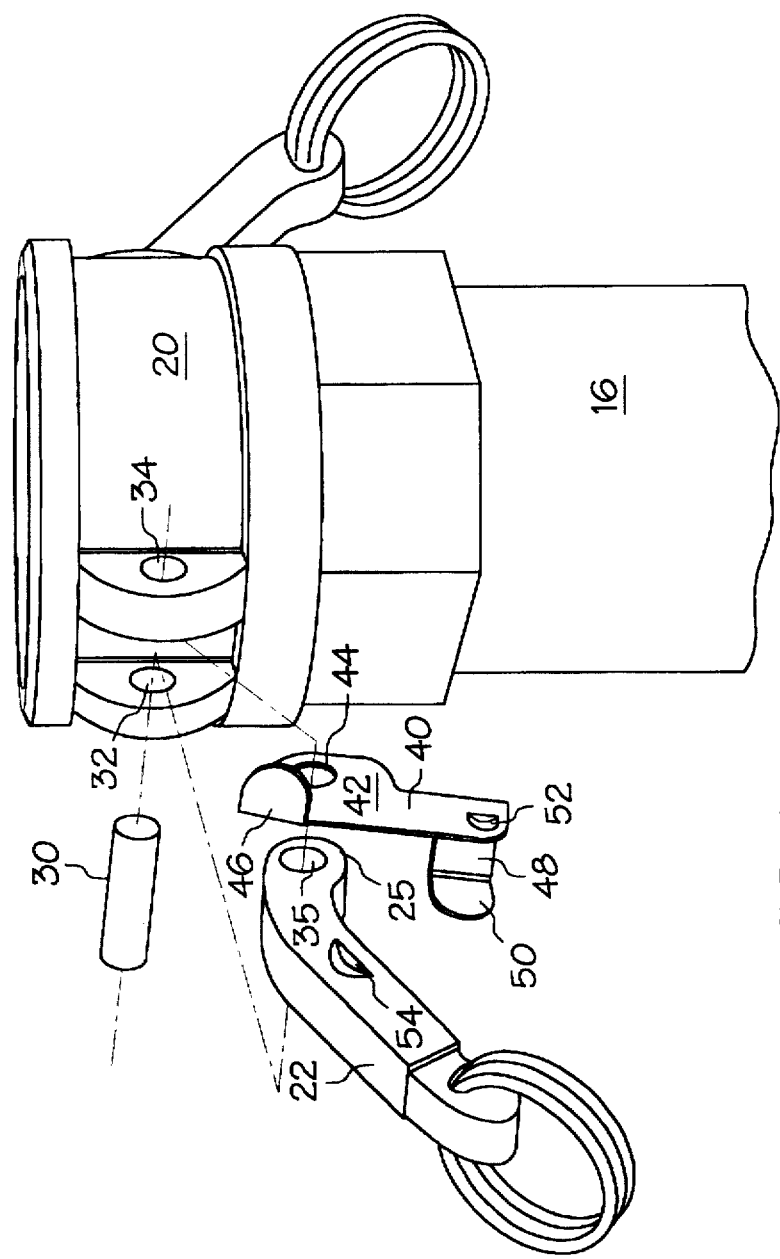
FIG. 4 is a partially exploded view of the coupling member of FIGS. 2 and 3 illustrating the manner in which the retainer member is secured to the coupling member.

As is apparent from viewing FIGS. 2–4, the female coupling member 20 includes a pair of oppositely disposed pivotally mounted cam arms 22 and 24. The cam arms 22 and 24 are used to rotate cam surfaces 25 (that are used to engage a peripheral groove (not shown) in male coupling member 18, as is well known in the art. Examples of male couplings with such peripheral grooves and female couplings having cam surfaces mounted on the end portions of cam arms are illustrated in the aforementioned U.S. Pat. Nos. 5,295,717 and 5,435,604, which patents are hereby incorporated by reference. In the illustrated embodiment, spring rings 27 and 29 are attached to the outboard ends of cam arms 22 and 24 respectively.

The cam arms 22, 24 each are pivotally interconnected to the female coupling member 20. In order to achieve this interconnection, a pair of outwardly extending pivot ears extend outwardly from the opposite outer surfaces of the coupling 20. One such pair of pivot ears 26, 28 are illustrated in FIGS. 2–4, which pivot ears 26,28 are positioned proximal to the outboard end of the coupling 20. Aligned apertures 32 and 34 extend through the pivot ears 26 and 28 respectively. An aperture 35 extends through the inboard end of the cam arm 22, as best illustrated in FIG. 4. With the cam arm positioned between the pivot ears 26, 28 and the cam arm aperture 35 aligned with pivot ear apertures 32, 34, the cam arm 22 is pivotally secured to the coupling 20 by a pin 30. Cam arm 24 is pivotally secured to the opposite side of the coupling 20 (obscured in the drawings) in a similar manner.

FIG. 2 shows the cam arms 22, 24 in a first unlocked position in which the cam arms 22, 24 extend radially outwardly from the coupling 20. As those skilled in the art will readily appreciate, the radial distance between the pivotal axis of the cam arms 22, 24 (extending through cam arm aperture 35) and portions of the cam surfaces 25 vary as a function of circumferential position. More particularly, the cam surfaces 25 are configured and dimensioned so that, when the cam arms in the radially outwardly extending position of FIG. 2, the radial inward extension of cam surface 25 is minimized and the cam surfaces 25 do not extend into the groove of a male coupling positioned with the coupling member 20. The cam surfaces also are configured so that when the cam arms 22, 24 are rotated to a locked position, as depicted in FIG. 3, the cam surfaces 25 extend into and apply a pressing force against the retaining groove of the male coupling member positioned within the coupling 20.

As noted above, it is important to protect against unintended rotational movement of cam arms 22, 24, which unintended movement might release the connection between the coupling 20 and a retained male coupling member (not shown). Thus, in accordance with the principles of the present invention, the cam arms 22, 24 of the illustrated embodiment are restrained against unintended rotation by a locking mechanism, generally designated by the numeral 40. The locking mechanism 40 includes a base portion 42, which base 42 has a generally planar configuration in the preferred embodiment. An aperture 44 extends through the base portion 42 and receives the pin 30, which pin 30 secures the locking mechanism 40 to the coupling 20. A stop surface 46 is attached to the base portion 42. The stop surface 46 of the illustrated embodiment has a substantially planar configuration and extends in substantially perpendicular relationship to the base portion 42. The stop surface 46 abuts against the coupling 20 to prevent relative rotation between the locking mechanism 40 and the coupling 20.

A substantially planar connecting portion 48 of the locking mechanism 40 extends outwardly from the base portion 42 and serves to connect the base portion 42 to a pressure surface 50. The pressure surface 50 is in spaced parallel relationship to the base portion 42 and substantially perpendicular to the connecting portion 48. Together with the connecting portion 48 and the base portion 42, the pressure surface 50 defines an open-sided receiving channel, designated in the drawings by the numeral 51. The space between pressure surface 50 and base portion 42 is slightly greater than the width of lever arm 22. As shown in FIG. 3, the receiving channel 51 receives the lever arm 22 when the lever arm 22 is in its locked position.

According to one significant aspect of the invention, the base portion 42 has an interlocking interface that is selectively interlocked to the side of lever arm 22. In the preferred form of the invention, the interlocking interface is in the form of a protrusion 52 that extends into the open-sided channel 51. The protrusion 52 is selectively received by a complementary interlocking interface in the form of a recess 54 in a first side of the lever arm 22. When so received, the locking mechanism 40 and lever arm 22 are coupled together, and rotation of the lever arm 22 is prevented.

The locking mechanism 40 is resiliently deformable. With the lever arm 22 in its locked position, as illustrated in FIG. 3, and the locking mechanism in its non-deflected state, the protrusion 52 extends into the recess 54 to lock the lever arm 22 in the position depicted in the drawing at FIG. 3. The pressure surface 50 is spaced from the opposite side of the lever arm in this undeflected state of the locking mechanism 40. However, when pressure is applied against pressure surface 50 in the direction toward the base portion 42, the base portion 42 is deflected and the protrusion 52 is removed from recess 54.

In summary, numerous benefits have been described which result from employing the concepts of the present invention. Advantageously, the locking mechanism of the invention is low cost and does not include projecting structures that are susceptible to impact damage. The embodiment of the invention illustrated in the drawings was chosen and described in order to best illustrate the principles of the invention and its practical application to thereby enable one of ordinary skill in the art to best utilize the invention in various embodiments and with various modifications as are suited to the particular use contemplated. For example, it is contemplated that different types of interlocking interfaces could be used to interlock the locking mechanism and the lever arm, such as a projecting structure that extends outwardly from the lever arm and is received by a complementary interface, such as a aperture or recess in the base portion. It is intended that the scope of the invention be defined by the claims appended hereto.

What is claimed is:

1. A device for selectively limiting rotation of a lever arm on a coupling member and securing the lever arm in a locked position, comprising:

(a) a base portion having an attachment point for attachment to a coupling member;

(b) a first interlocking interface on a side portion of the base portion, the first interlocking interface being adapted to selectively interlock with a second interlocking interface on a lever arm for coupling the base portion to the lever arm to limit rotation of the lever arm relative to said base portion, wherein one of said interfaces comprises a protruding portion and the other of said interfaces comprises a recessed portion for receiving the protruding portion;

(c) a stop surface attached to the base portion and disposed a distance from said attachment point, the stop surface being adapted to engage a portion of the coupling member so as to limit relative rotation of the base portion with respect to the coupling member about the attachment point; and (d) a manually actuated pressure surface attached to the base portion, the pressure surface being operative, upon the application of pressure thereto, to deflect the base portion when the base portion is secured to a coupling member, whereby the application of pressure to the pressure surface is operative to uncouple the interlocking interfaces and to permit rotation of the lever.

2. A device as recited in claim 1 wherein the first interlocking interface includes a protrusion that extends outwardly from the base portion.

3. A device as recited in claim 1 wherein the pressure surface is positioned in spaced relationship to the base portion so as to accommodate placement of a lever arm in the space between the pressure surface and the base portion and to position the base portion and the pressure surface adjacent opposite sides of a lever arm so placed.

4. A device as recited in claim 3 wherein the pressure surface is orientated in generally parallel relationship to the base portion.

5. A device as recited in claim 1 wherein the pressure surface is interconnected to the base portion by a connecting portion that extends outwardly from the base portion.

6. A device as recited in claim 5 wherein the connecting portion extends outwardly from a bottom portion of the base portion and is generally perpendicular relationship to the base portion and the pressure surface.

7. A device as recited in claim 6 wherein the connecting portion cooperates with the base portion and pressure surface to define an open-sided receiving channel.

8. A device as recited in claim 1 wherein the stop portion extends outwardly in substantially perpendicular relationship to the base portion.

9. A device as recited in claim 1 wherein said attachment point on said base portion includes an aperture adapted to receive a pivot pin.

10. In combination with a coupling member having at least one rotatably movable cam arm and a connector for connecting the cam arm to the coupling member, the cam arm having a cam surface for selectively engaging a groove in a mating member and thereby locking the coupling member to the mating member, the cam arm being rotatably movable about an axis of rotation between a first locked position and a second unlocked position, a system for releasably securing the cam arm in the locked position, comprising:

(a) a base portion disposed adjacent to a first side of the cam arm, said base portion being attached to the coupling member by the connector and being deflectably movable in a first direction from a first undeflected position to a second deflected position, the first direction being generally parallel to the cam arm's axis of rotation;

(b) a stop surface attached to the base portion and disposed a distance from the axis of rotation, wherein the stop surface is adapted for rotating toward the coupling member and engaging a portion of the coupling member for limiting relative rotation of the base portion with respect to the coupling member in at least one rotational direction about the axis of rotation;

(c) a first interlocking interface on a side portion of the base portion, the first side of the cam arm having a second interlocking interface that interacts with the first interface for selectively coupling the base portion to the cam arm, wherein one of said interfaces comprises a protruding portion and the other of said interfaces comprises a recessed portion for receiving the protruding portion; and (d) a manually actuated pressure surface attached to the base portion, the pressure surface being operative upon the application of pressure thereto to uncouple the base portion and the cam arm by disengaging the protruding portion from the recessed portion.

11. A system as recited in claim 10 wherein the first interlocking interface includes a protrusion that extends outwardly from the base portion.

12. A system as recited in claim 11 wherein the second interface includes a recess in the first side of the cam arm.

13. A system as recited in claim 12 wherein the second interlocking interface has a shape that is complementary to the first interface.

14. A system as recited in claim 10 further including a connecting portion for attaching the pressure surface to the base portion.

15. A system as recited in claim 14 wherein the pressure surface is in spaced relationship to the base portion, and the pressure surface, the connecting portion and the base portion define an open-sided receiving channel in the space between the pressure surface and the base portion for receiving the cam arm when the cam arm is in the locked position.

16. A system as recited in claim 15 wherein the space between the pressure surface and the base portion is greater than the width of the cam arm, and the base portion and the pressure surface are respectively disposed adjacent first and second sides of the cam arm when the cam arm is disposed within the channel.

17. A system as recited in claim 10 wherein the first interlocking interface has the protruding portion formed thereon and the second interlocking interface has the recessed portion formed thereon, wherein the recessed portion is complementary in shape to the protruding portion.

18. A system as recited in claim 10 wherein the base portion has a substantially planar configuration.

19. A system as recited in claim 10 wherein the stop portion extends outwardly from the base portion in the first direction.

20. A system as recited in claim 10 wherein the stop portion extends outwardly in substantially perpendicular relationship from the base portion.

21. A system as recited in claim 10 wherein the connector comprises a pin about which the cam arm and base portion are rotatably supported, and wherein the base portion includes an aperture through which the pin extends.

22. A system as recited in claim 10 wherein the pressure surface is attached to the base portion by a connecting portion that is connected to the lower side of the base portion, the connecting portion cooperating with the base portion and the pressure surface to define the open-sided receiving channel.

23. A system as recited in claim 10 wherein the connecting portion is substantially planar.

24. In combination with a coupling member having at least one rotatably movable cam arm and a connector for connecting the cam arm to the coupling member, the cam arm having a cam surface for selectively engaging a groove in a mating member and thereby locking the coupling member to the mating member, the cam arm being rotatably movable about an axis of rotation between a first locked position and a second unlocked position, a device for releasably securing the cam arm in the locked position, comprising:

(a) a base portion having an attachment point, said base portion being rotatable attached to the coupling member by the connector at the attachment point and being deflectably movable in a first direction from a first undeflected position to a second deflected position, the first direction being generally parallel to the base portion's axis of rotation;

(b) a stop surface attached to the base portion and disposed a distance from said attachment point such that the stop surface can be rotated about the attachment point and toward the coupling member and contact a portion of the coupling member when the device is rotated about the attachment point, thereby limiting relative rotation of the base portion with respect to the coupling member in at least one rotational direction about the attachment point;

(c) a manually actuated pressure surface attached to the base portion, the pressure surface being operative, upon the application of pressure thereto, to deflect the base portion in the first direction when the base portion is secured to the coupling member, whereby the application of pressure to the pressure surface is operative to uncouple the base portion from the cam arm and to permit rotation of the cam arm;

(d) an interlocking interface comprising a protrusion extending from the side of the base portion in a direction generally parallel to the axis of rotation and toward the pressure surface, the protrusion being received by a complementary recess in the first side of the cam arm to prevent rotation of the cam arm when the cam arm is in its locked position and the base portion is in its undeflected position, the base portion being movable from its first to its second positions in response to the application of pressure in the first direction against the pressure surface, the protrusion being removed from the recess to permit rotation of the cam arm when the base portion is in its second position.

* * * * *